Borden & Power.
Soldering Furnace.

Nº 90,987.  Patented Jun. 8, 1869.

Witnesses
A. W. Almquist
Hinchman
Geo. W. Mabee

Inventor.
G. Borden
M. Power
PER
Attorneys

United States Patent Office.

JOHN G. BORDEN AND WALTER POWER, OF BREWSTER STATION, NEW YORK.

Letters Patent No. 90,987, dated June 8, 1869.

IMPROVEMENT IN SOLDERING-FURNACE.

The Schedule referred to in these Letters Patent and making part of the same.

*To all whom it may concern:*

Be it known that we, JOHN G. BORDEN and WALTER POWER, of Brewster Station, in the county of Putnam, and State of New York, have invented a new and improved Soldering-Machine; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Our invention has for its object to furnish an improved machine, by means of which the heads of sheet-metal cans may be soldered to their bodies quickly and thoroughly, and without waste or undue use of the solder.

And it consists in the construction and combination of various parts of the machine, as hereinafter more fully described.

A represents the stove or furnace, about the construction of which there is nothing new.

Figure 1:
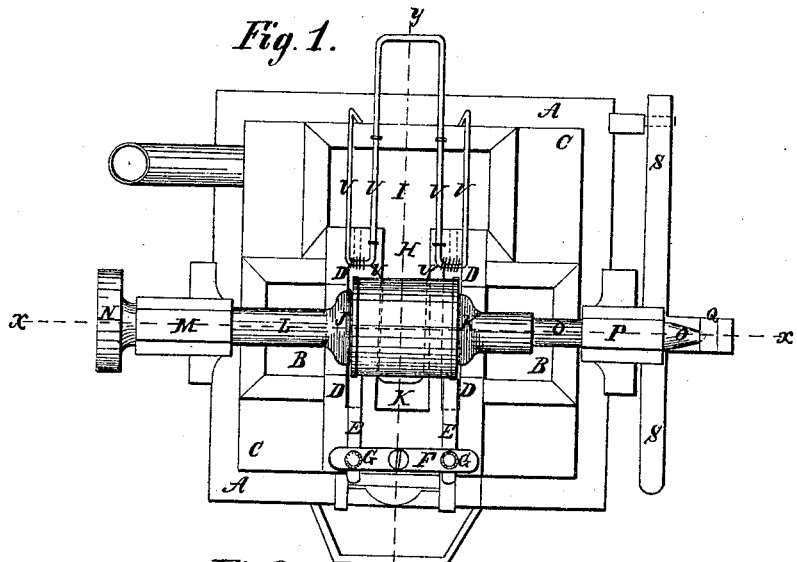
Figure 1 is a top or plan view of our improved machine.
Figure 2:
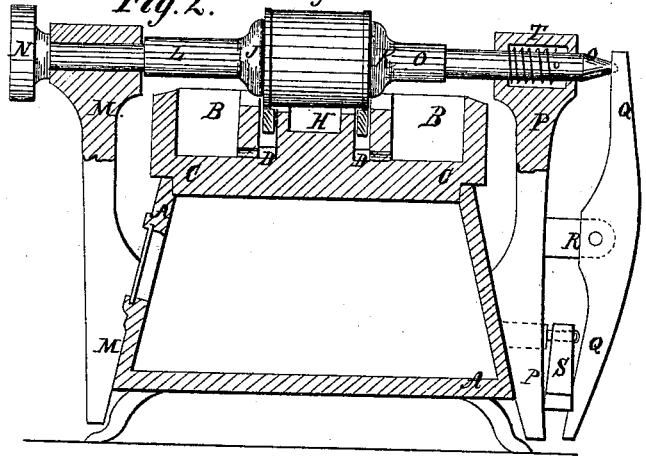
Figure 2 is a vertical cross-section of the same, taken through the line $x\ x$, fig. 1.

B are two chambers, formed upon the top of the top plate C of the stove or furnace, and at a distance apart a little more than the length of the cans to be soldered, as shown in figs. 1 and 2.

Into the chambers B is put the solder to be melted. As the solder melts, it flows through openings in the lower part of the partition-walls into the chambers D, formed along the inner sides of the chambers B, and made of such a size as to contain the soldering-tools E.

This manner of introducing the solder into the chambers D wholly excludes the dross which is left in the chambers B.

Figure 3:
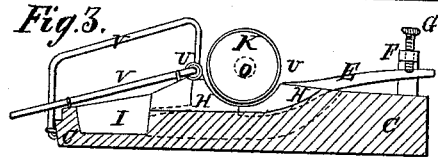
Figure 3 is a detail longitudinal section, taken through the line $y\ y$ of fig. 1.

The soldering-tools are made in about the form and manner shown in figs. 1, 2, and 3, that is to say, the upper edge of their forward ends are concaved to correspond somewhat with the curve of the cans, and their outer ends project out beneath the projecting ends of the rest F, attached to the forward part of the plate top C, where they are adjustably held in place by set-screws G, passing down through the said projecting ends of the rest F.

The soldering-tools are kept hot by the heat of the chambers D and of the melted solder in said chambers, and feed the solder to the seams of the cans to be soldered by the attraction between their tinned ends and the said solder.

H is a chamber or spout formed between the two chambers D, to receive any solder that may overflow from the said chambers D, and conduct it into the chamber I, formed in the rear part of the top plate C.

The chambers D are also connected with the chamber I by small channels, as shown in dotted lines in figs. 1 and 3, to prevent the said chambers D from becoming too full.

The melted solder that accumulates in the chamber I may be dipped back into the chambers B when required.

The middle parts of the upper edges of the partitions between the chambers B, D, and H, are hollowed out, or concaved, to correspond somewhat with the curve of the cans to be soldered, as shown in fig. 3.

The cans, while being soldered, are held between the centres or heads J and K, and are revolved by the revolution of said heads or centres.

The shaft L of the head J revolves in bearings in the standard M, at the side of the stove or furnace A, is without longitudinal movement, and has a crank or pulley N attached to it, by means of which it may receive motion from hand or other power.

The shaft O of the centre or head K revolves in bearings in the standard P, at the other side of the stove or furnace A, in such a way as to both revolve and have a longitudinal movement.

The outer end of the shaft O is rounded off, or made pointed, and rests against the upper end of the lever Q, which is pivoted to supports R, attached to the standards P, and the lower end of which inclines inward toward the lower part of the said standard P, as shown in fig. 2, so as to form a wedge-shaped space between the said standard and lever.

S is a lever, the rear end of which is pivoted to some suitable support at the side of the rear part of the stove or furnace A.

The lever S passes through the wedge-shaped space, between the standard P and lever Q, and its forward end extends out into such a position that it may be conveniently reached and operated, so that, by forcing the said lever S downward, the head or centre K will be forced forward to clamp the can to be soldered between the heads or centres J and K.

When the lever S is raised, the head or centre K is withdrawn from the can, by a coiled or equivalent spring, T, connected with the shaft O.

U is a spring, upon which the can rests while being soldered, and which should be of sufficient strength to raise the said can when released from the heads or centres J K, and allow it to roll down the inclined guideway V, which is attached to the top plate C, to conduct the soldered cans out of the way.

Having thus described our invention,

We claim as new, and desire to secure by Letters Patent—

1. The top plate C of a stove or furnace, provided with chambers B, D, H, and I, constructed and arranged substantially as herein shown and described, and for the purpose set forth.

2. The combination of the heads or centres J K, and shafts L P, with the top plate C, provided with the chambers B, D, H, and I, substantially as herein shown and described, and for the purpose set forth.

3. The soldering-tools E, in combination with the chambers D of the top plate C, and with the heads or centres J K, substantially as herein shown and described, and for the purpose set forth.

4. Adjustably securing the soldering-tools E, by means of the rest F and set-screws G, substantially as herein shown and described, and for the purpose set forth.

5. The combination of the levers Q and S and spring T, or their equivalent, with the shaft O of the centre or head K, and with the standard P, substantially as herein shown and described, and for the purpose set forth.

WALTER POWER.
JOHN G. BORDEN.

Witnesses:
J. S. ENO,
AVERY L. BRUSH.